United States Patent
Chang et al.

(10) Patent No.: US 8,218,461 B2
(45) Date of Patent: Jul. 10, 2012

(54) APPARATUS AND METHOD FOR SUPPORTING RELAY SERVICE IN MULTIHOP RELAY WIRELESS COMMUNICATION SYSTEM

(75) Inventors: Young-Bin Chang, Anyang-si (KR); Chang-Yoon Oh, Yongin-si (KR); Hyun-Jeong Kang, Seoul (KR); Jae-Weon Cho, Suwon-si (KR); Hyoung-Kyu Lim, Seoul (KR); Sung-Jin Lee, Seoul (KR); Yeong-Moon Son, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 11/875,344

(22) Filed: Oct. 19, 2007

(65) Prior Publication Data
US 2008/0095038 A1  Apr. 24, 2008

(30) Foreign Application Priority Data

| Oct. 20, 2006 | (KR) | 10-2006-0102533 |
| Nov. 9, 2006 | (KR) | 10-2006-0110744 |
| Sep. 14, 2007 | (KR) | 10-2007-0093897 |
| Sep. 21, 2007 | (KR) | 10-2007-0096632 |

(51) Int. Cl.
*H04B 7/14* (2006.01)
(52) U.S. Cl. .................................................. 370/279
(58) Field of Classification Search ............ 370/276, 370/277, 280, 294, 296
See application file for complete search history.

(56) References Cited

U.S. PATENT DOCUMENTS

| 7,020,501 | B1 | 3/2006 | Elliott et al. | |
| 2002/0051425 | A1 | 5/2002 | Larsson | |
| 2002/0141355 | A1* | 10/2002 | Struhsaker et al. | 370/280 |
| 2004/0001579 | A1* | 1/2004 | Feinberg et al. | 379/156 |
| 2004/0242154 | A1 | 12/2004 | Takeda et al. | |
| 2006/0153132 | A1* | 7/2006 | Saito | 370/329 |
| 2007/0019667 | A1* | 1/2007 | Mottier et al. | 370/458 |
| 2007/0249347 | A1* | 10/2007 | Saifullah et al. | 455/436 |
| 2008/0002734 | A1* | 1/2008 | Zheng et al. | 370/445 |
| 2008/0045148 | A1 | 2/2008 | Okuda | |
| 2008/0260000 | A1* | 10/2008 | Periyalwar et al. | 375/133 |
| 2009/0046606 | A1* | 2/2009 | Wan et al. | 370/280 |

FOREIGN PATENT DOCUMENTS

| JP | 2008-048203 | 2/2008 |
| WO | WO 2004/107693 | 12/2004 |
| WO | WO 2006/006828 | 1/2006 |

* cited by examiner

*Primary Examiner* — Huy D Vu
*Assistant Examiner* — Adnan Baig
(74) *Attorney, Agent, or Firm* — The Farrell Law Firm, P.C.

(57) ABSTRACT

Apparatus and method for supporting a relay service in a multihop relay wireless communication system are provided. The method includes setting Tx/Rx mode switch region information of a Relay Station (RS). A signal is sent to a Mobile Station (MS) traveling in a service coverage during a first interval of a DownLink (DL) subframe according to resource allocation information. The mode switch region information and a signal are sent over a second interval of the DL subframe. Accordingly, the RS can communicate with a Base Station (BS) with accurate synchronization.

19 Claims, 14 Drawing Sheets

APPARATUS AND METHOD FOR SUPPORTING RELAY SERVICE IN MULTIHOP RELAY WIRELESS COMMUNICATION SYSTEM

PRIORITY

This application claims priority under 35 U.S.C. §119(a) to applications filed in the Korean Intellectual Property Office on Oct. 20, 2006 and assigned Serial No. 2006-0102533, on Nov. 9, 2006 and assigned Serial No. 2006-0110744, on Sep. 14, 2007 and assigned Serial No. 2007-0093897, and on Sep. 21, 2007 and assigned Serial No. 2007-0096632, the disclosures of which are incorporated herein by reference.

BACKGROUND OF THE INVENTION

1. Field of the Invention

The present invention relates generally to a multihop relay wireless communication system, and more particularly, to a method for constructing a frame of a Relay Station (RS) to support a relay service in the multihop relay wireless communication system, and an apparatus for supporting the method.

2. Description of the Related Art

A wireless communication system is able to allocate uplink/downlink resources using a Time Division Duplex (TDD) scheme and a Frequency Division Duplex (FDD) scheme.

Using the FDD scheme, the wireless communication system separates uplink and downlink using frequency resources.

Using the TDD scheme, the wireless communication system splits uplink and downlink using time resources over the same frequency band.

For the TDD scheme, the wireless communication system splits a frame to a transmit (Tx) interval and a receive (Rx) interval using the time resource as shown in FIG. 1.

FIG. 1 illustrates a typical frame structure of an Institute of Electrical and Electronics Engineers (IEEE) 802.16 system.

A j-th frame 100 of FIG. 1 includes a DownLink (DL) subframe 101 and an UpLink (UL) subframe 103 which are split using the time resources.

A Base Station (BS) constructs a BS frame 120 over the j-th frame 100, which includes the DL subframe 101 for sending a DL signal to a Mobile Station (MS) and the UL subframe 103 for receiving a UL signal from the MS. A Transmit/Receive Transition Gap (TTG) 105 is a time guard region that lies between the DL subframe 101 and the UL subframe 103 of the BS frame 120. A Receive/Transmit Transition Gap (RTG) 107 is a time guard region that lies between the j-th frame 100 and a (j+1)-th frame 140.

The MS constructs an MS frame 130 over the j-th frame 100, which includes the DL subframe 101 for receiving the DL signal from the BS and the UL subframe 103 for sending the UL signal to the BS. The MS receives the DL signal from the BS after a DL delay (e.g., DownLink one way Delay (DLD)) caused by the radio channel. The MS sends the UL signal by considering an UpLink one-way Delay (ULD) so that the BS can receive the UL signal over the UL subframe 103 of the BS frame 120.

For the delay of the radio channel, a Subscriber Station Receive/Transmit Transition Gap (SSRTG) 113 is the time guard region that lies between the DL subframe 101 and the UL subframe 103 of the MS frame 130. A Subscriber Station Transmit/Receive Transition Gap (SSTTG) 115 is the time guard region that lies between the j-th frame 100 and the (j+1)-th frame 140.

As discussed above, the BS and the MS construct the BS frame 120 and the MS frame 130 including the time guard region for the operation switch between the DL subframe 101 and the UL subframe 103 respectively. In doing so, the TTG 105 of the BS frame 120 is designed to have the same value as the summation of the DLD, the SSRTG 113, and the ULD. The RTG 107 of the BS frame 120 is designed to be equal to the value acquired by subtracting the DLD and the ULD from the SSTTG 115 in length.

Recently, to reconfigure the network more rapidly in response to changes in the communication environment and to utilize the wireless network more efficiently, research on communication methods using a Relay Station (RS) are being conducted in the wireless communication system. Since an RS relays signals between a BS and an MS, the wireless communication system requires not only a link between the BS and the MS but also a link between the BS and the RS and a link between the RS and the MS. Therefore, what is needed is a new communication method and a new frame structure for the communication methods using an RS in the wireless communication system.

SUMMARY OF THE INVENTION

The present invention has been made to address at least the above problems and/or disadvantages, and to provide at least the advantages described below. Accordingly, an aspect of the present invention is to provide an apparatus and method for supporting a relay service in a multihop relay wireless communication system.

Another aspect of the present invention is to provide a frame construction method for supporting a relay service in a multihop relay wireless communication system, and an apparatus for supporting the method.

A further aspect of the present invention is to provide an apparatus and method for setting a time guard region in a multihop relay wireless communication system.

The above aspects are achieved by providing an upper node operation method in a wireless communication system using a relay scheme, which includes confirming Transmit (Tx) and Receive (Rx) operation switch information of a lower RS; and sending a control message for the Tx/Rx operation switch to the lower RS.

According to one aspect of the present invention, a Relay Station (RS) operation method in a wireless communication system using a relay scheme is provided. Signal delay times are confirmed with an upper node. Tx/Rx operation switch time information is exchanged with the upper node. Overheads according to the Tx/Rx operation switch are calculated using the Tx/Rx operation switch time information and the signal delay times. Overheads are taken into account to communicate.

According to a further aspect of the present invention, an RS in a wireless communication system using a relay scheme is provided. The RS includes a timing controller for issuing a timing signal for a Tx/Rx operation switch. The RS also includes a transmitter for generating a frame according to a frame construction and sending the frame via an antenna when the RS enters a Tx mode according to the timing signal. The RS further includes a receiver for detecting and confirming a corresponding subframe from the frame received on the antenna when the RS enters a Rx mode according to the timing signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following detailed description, well-known processes or constructions are not described in detail to avoid obscuring the subject matter of the present invention.

The present invention provides a frame construction method for supporting a relay service in a multihop relay wireless communication system.

Hereafter, the wireless communication system using a TDD scheme and an Orthogonal Frequency Division Multiple Access (OFDMA) scheme is illustrated by way of example. Note that the present invention is applicable to communication systems using other communication schemes.

Figure 1:
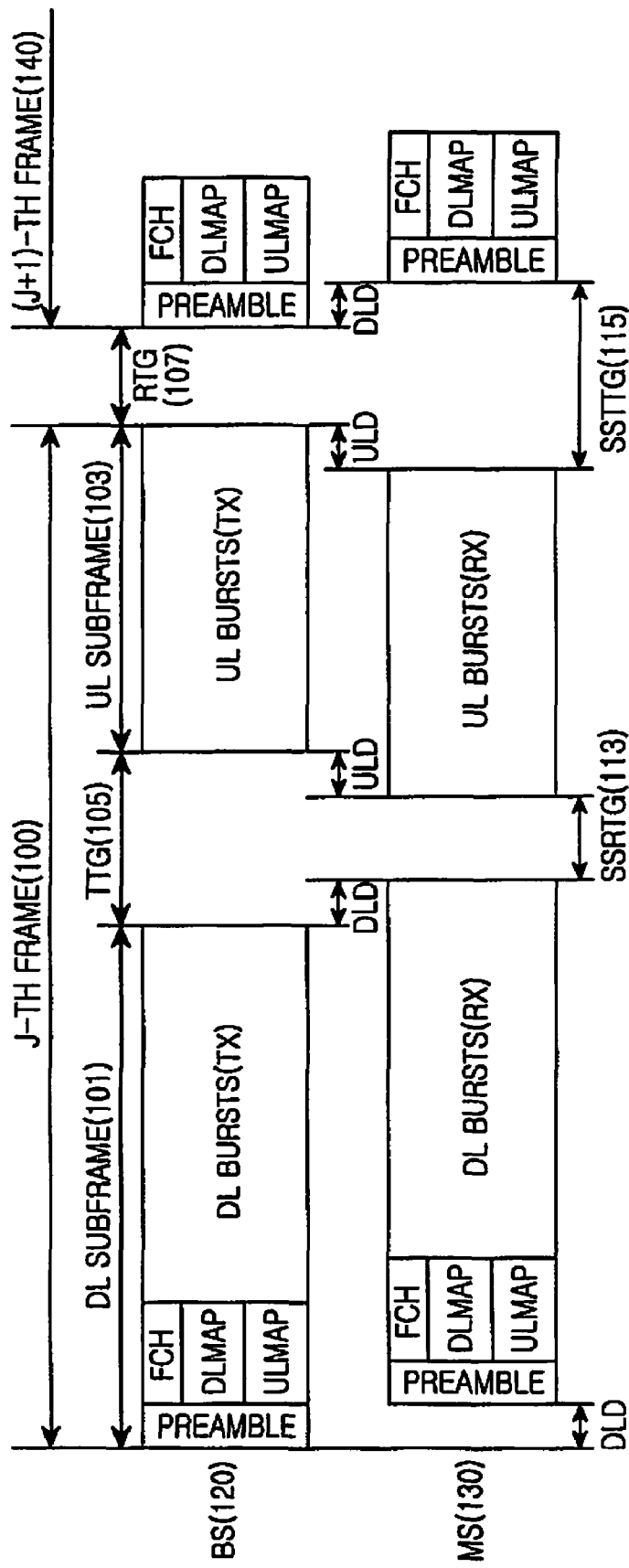
FIG. 1 illustrates a typical frame structure of an IEEE 802.16 system.
Figure 2:
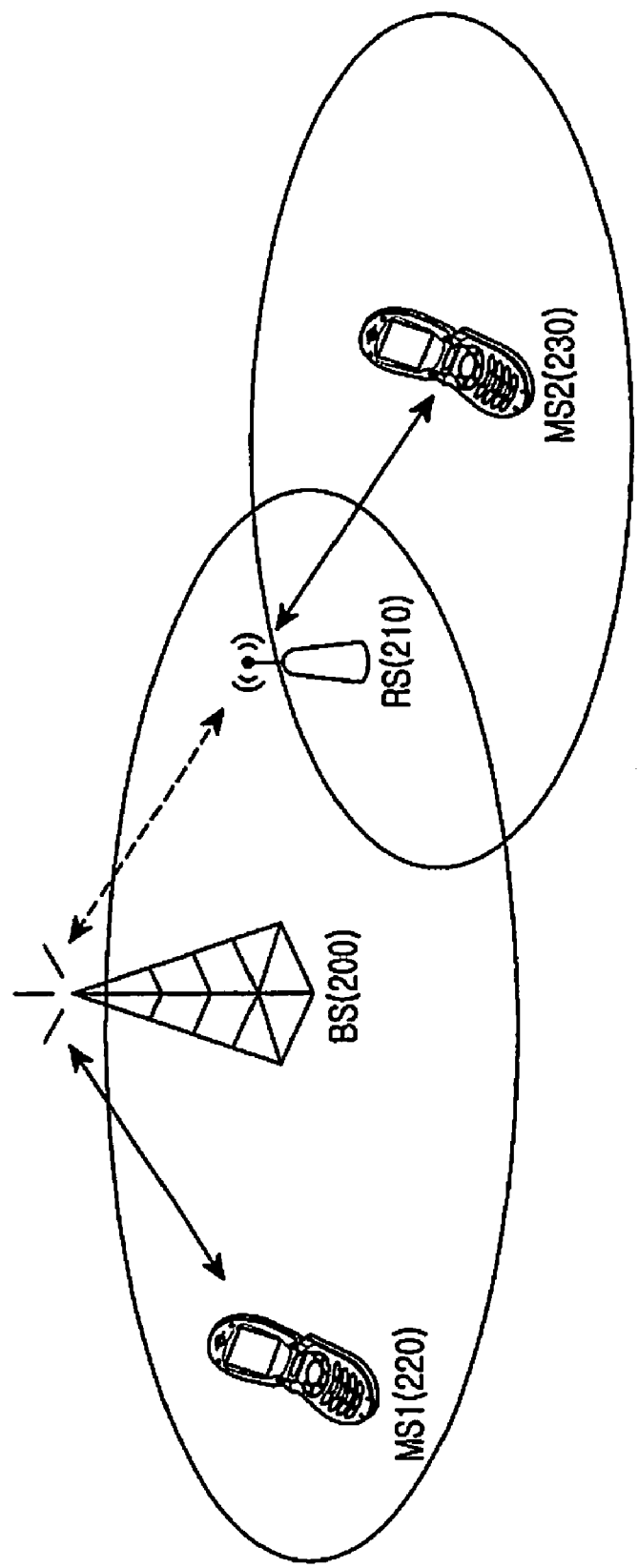
FIG. 2 illustrates a multihop relay wireless communication system according to an embodiment of the present invention.

FIG. 2 illustrates a multihop relay wireless communication system according to an embodiment of the present invention. While a 2-hop wireless communication system is described in this embodiment, the wireless communication system can be constructed with multiple hops.

The wireless communication system of FIG. 2 includes a BS 200, an RS 210, and MSs 220 and 230. A first MS 220 travels in a service coverage of the BS 200 and directly communicates with the BS 200.

A second MS 230 travels outside the service coverage of the BS 200 and accordingly communicates with the BS 200 via the RS 210.

By means of the RS 210, the BS 200 provides a better radio channel to MSs that travel outside the service coverage of BS 200, or to MSs that suffer a poor channel condition in a shadow area under a severe shielding effect caused by buildings.

Figure 3:
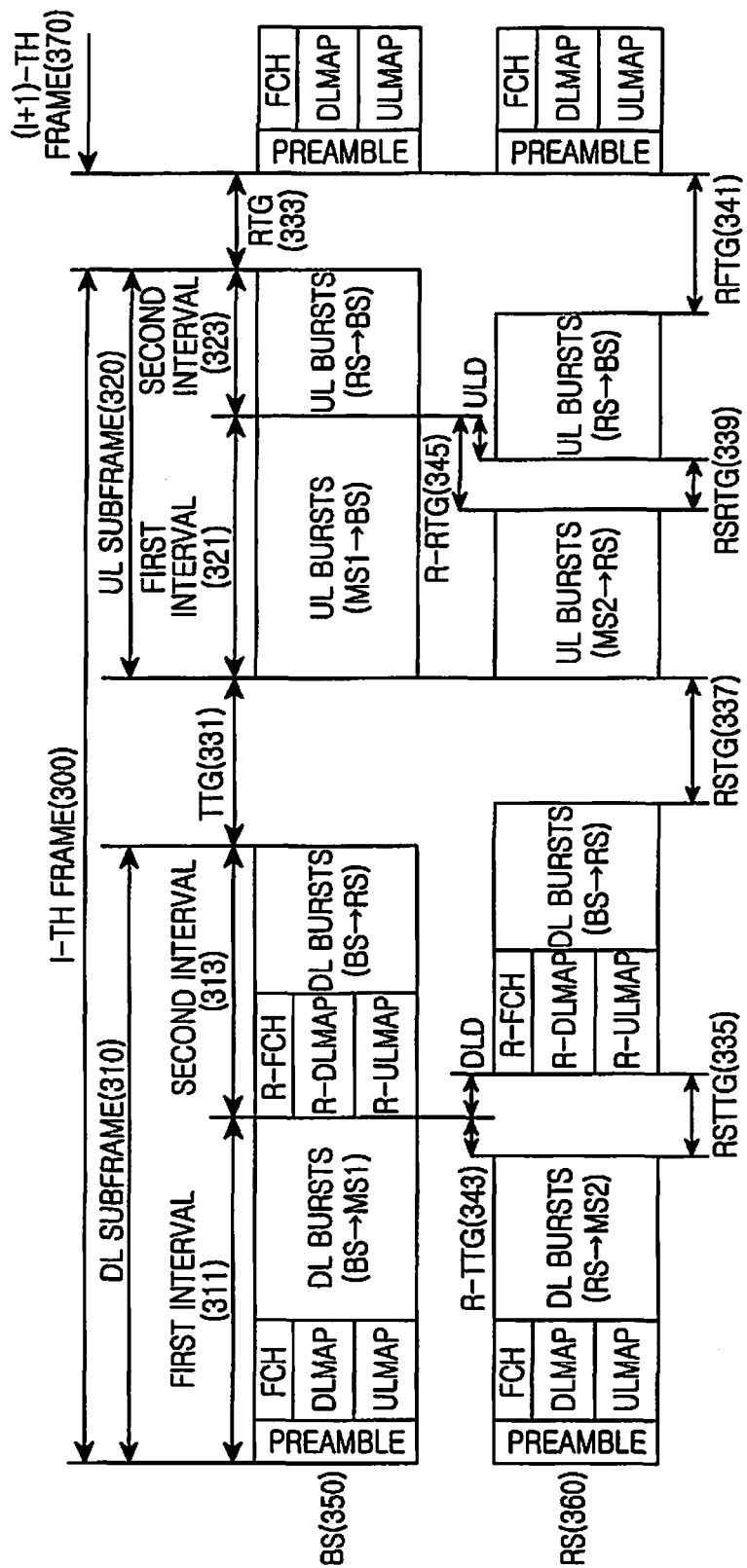
FIG. 3 illustrates a timing configuration of the multihop relay wireless communication system according to an embodiment of the present invention.

In the wireless communication system constructed as above, the BS, the RS, and the MS communicate with each other using a frame structure and timing shown in FIG. 3.

It is assumed that the wireless communication system constructs a subframe for a link between the BS and the MS in a first interval of the frame and constructs a subframe for a link between the BS and the RS in a second interval of the frame.

FIG. 3 illustrates the timing configuration of the multihop relay wireless communication system according to an embodiment of the present invention. In the following, a detailed description of an in-band frame for supporting the 2-hop wireless communication system of FIG. 2 is provided. The in-band frame is a physical frame structure constituted according to the TDD scheme to enable the BS, the RS, and the MS to communicate using one frequency resource. If the wireless communication system is of multiple hops, the in-band frame indicates the physical frame structure constituted according to the TDD scheme to enable the BS, the upper RS, the lower RS, and the MS to use a single frequency resource.

An i-th frame 300 of FIG. 3 includes a DownLink (DL) subframe 310 and an UpLink (UL) subframe 320 split using time resources. The DL subframe 310 and the UL subframe 320 are divided to first intervals 311 and 321, respectively, and second intervals 313 and 323, respectively, using the time resources. The first intervals 311 and 321 indicate a DL access zone and a UL access zone, respectively. The second intervals 313 and 323 indicate a DL relay zone and a UL relay zone, respectively.

The DL subframe 310 of a BS frame 350 includes the first interval 311 for sending a signal from the BS to the first MS connected through the direct link, and the second interval 313 for sending a signal from the BS to the RS.

The UL subframe 320 of the BS frame 350 includes the first interval 321 for receiving a UL signal from the first MS and the second interval 323 for receiving a UL signal from the RS.

A time guard region TTG 331 lies between the DL subframe 310 and the UL subframe 320 of the BS frame 350. A time guard region RTG 333 lies between the i-th frame 330 and a (i+1)-th frame 370. The BS sends a signal over the DL subframe 310 and then switches from the Tx mode to the Rx mode during the TTG 331 to receive a signal over the UL subframe 320. The BS receives a signal over the UL subframe 320 and then switches from the Rx mode to the Tx mode during the RTG 333 to send a signal over a DL subframe of the (i+1)-th frame 70.

The DL subframe 310 of an RS frame 360 includes the first interval 311 for sending a signal to the second MS connected through a relay link, and the second interval 313 for receiving a signal from the BS. A time guard region Relay Station Transmit/Receive Transition Gap (RSTTG) 335_for the operation switch of the RS is inserted between the first interval 311 and the second interval 313. A DL overhead R Transmit/Receive Transition Gap (R-TTG) 343 according to the RSTTG 335 lies between the first interval 311 and the second interval 313. The RSTTG 335 and the R-TTG 343 are illustrated in further detail in FIG. 12.

Figure 12:
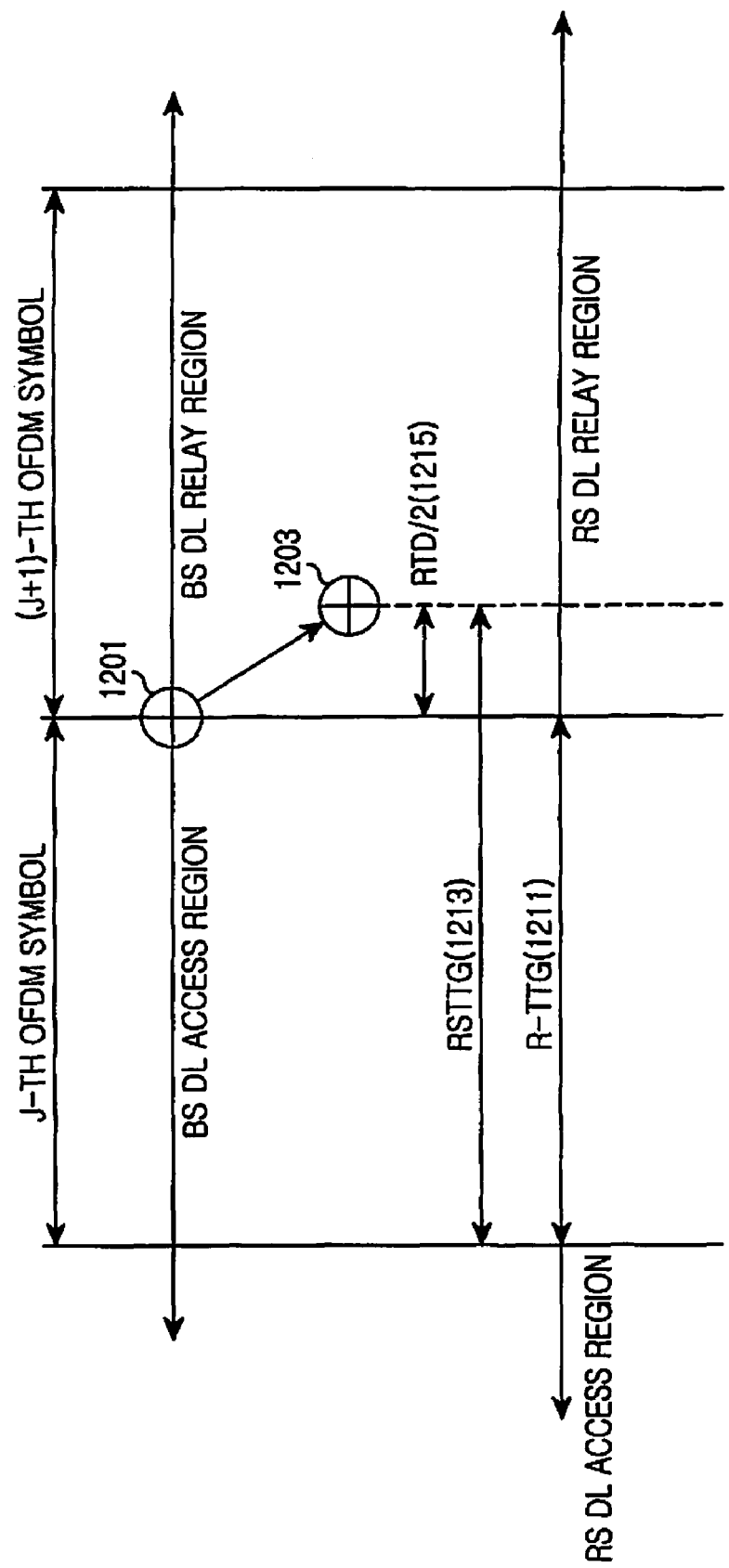
FIG. 12 illustrates an RS operation switch region of the DL subframe in the multihop relay wireless communication system according to an embodiment of the present invention.

FIG. 12 illustrates the RS operation switch region of the DL subframe in the multihop relay wireless communication system according to an embodiment of the present invention. A j-th Orthogonal Frequency Division Mulitple (OFDM) symbol indicates the last symbol of the first interval 311 and a (j+1)-th OFDM symbol indicates the first symbol of the second interval 313.

As shown in FIG. 12, an RSTTG 1213 for the RS operation switch region lies between the first interval 311 and the second interval 313 of the DL subframe 310. Thus, the RS can switch from the Tx mode to the Rx mode during the RSTTG 1213.

When the BS sends a DL signal at a time point 1201, the RS receives the DL signal at a time point 1203 because of a DL Round Trip Delay (RTD)/2 1215. Accordingly, the RS needs to enter the Rx mode prior to the time point 1203.

The RS switches its operation in the RSTTG 1213. Hence, the RS cannot send a DL signal to the second MS in the service coverage during a time period RSTTG-(RTD/2) 1211 at the end of the first interval 311 of the DL subframe 310. This region (e.g., RSTTG-(RTD/2) time period) for not sending the signal in the first interval 311 is referred to as a DL overhead R-TTG 1211.

If the RS cannot send a signal using a certain interval by splitting a signal OFDM symbol, the RS sets the R-TTG 1211 as the smallest OFDM symbol including the region not sending the signal. For example, to switch the operation within the j-th OFDM symbol of the RS, the RS sets the j-th OFDM symbol interval as the R-TTG 1211. The R-TTG 1211 can be calculated based on Equation (1). The R-TTG 1211 has an OFDM symbol unit value.

$$R\text{-TTG}=[\text{OFDMsymbolunit}(\text{RSTTG}-\text{RTD}/2)] \quad (1)$$

In Equation (1), RSTTG denotes the operation switch region of and RS and RTD/2 denotes the DLD. OFDMsymbolunit(x) denotes a function that divides x by one OFDM symbol length. The value x and the OFDM symbol length are set as the time unit. ⌈ ⌉ denotes the ceiling function. When a value in the brackets is the fraction, the ceiling function outputs an integer greater than the fraction.

As expressed in Equation (1), the DL subframe overhead is the minimum symbol including the operation switch region of the RS.

When the RSTTG 1213 is less than or equal to the RTD/2 1215, the R-TTG 1211 is set to zero because the RS can switch its operation during the RTD/2 1215.

Referring back to FIG. 3, the RS receives the DL signal from the BS in the second interval 313 of the DL subframe 310 of the RS frame 360. Next, the RS receives the UL signal from the second MS in the first interval 321 of the UL subframe 320. Accordingly, the RS does not need the time period for the operation switch between the second interval 313 of the DL subframe 310 and the first interval 321 of the UL subframe 320. Yet, the RS subframe 360 includes a Relay Subframe Time Gap (RSTG) 337 between the second interval 313 and the first interval 321 to hold the synchronization with the BS frame 350. The RSTG 337 has the same value as the value acquired by subtracting the DLD from the TTG 331.

The UL subframe 320 of the RS frame 360 includes the first interval 321 for receiving a UL signal from the second MS and the second interval 323 for sending a UL signal to the BS. A RSRTG 339, which is the time period for the RS operation switch, is inserted between the first interval 321 and the second interval 323. A UL overhead R-RTG 345 according to the RSRTG 339 is inserted between the first interval 321 and the second interval 323. The RSRTG 339 and the R-RTG 345 are illustrated in further detail in FIG. 13.

Figure 13:
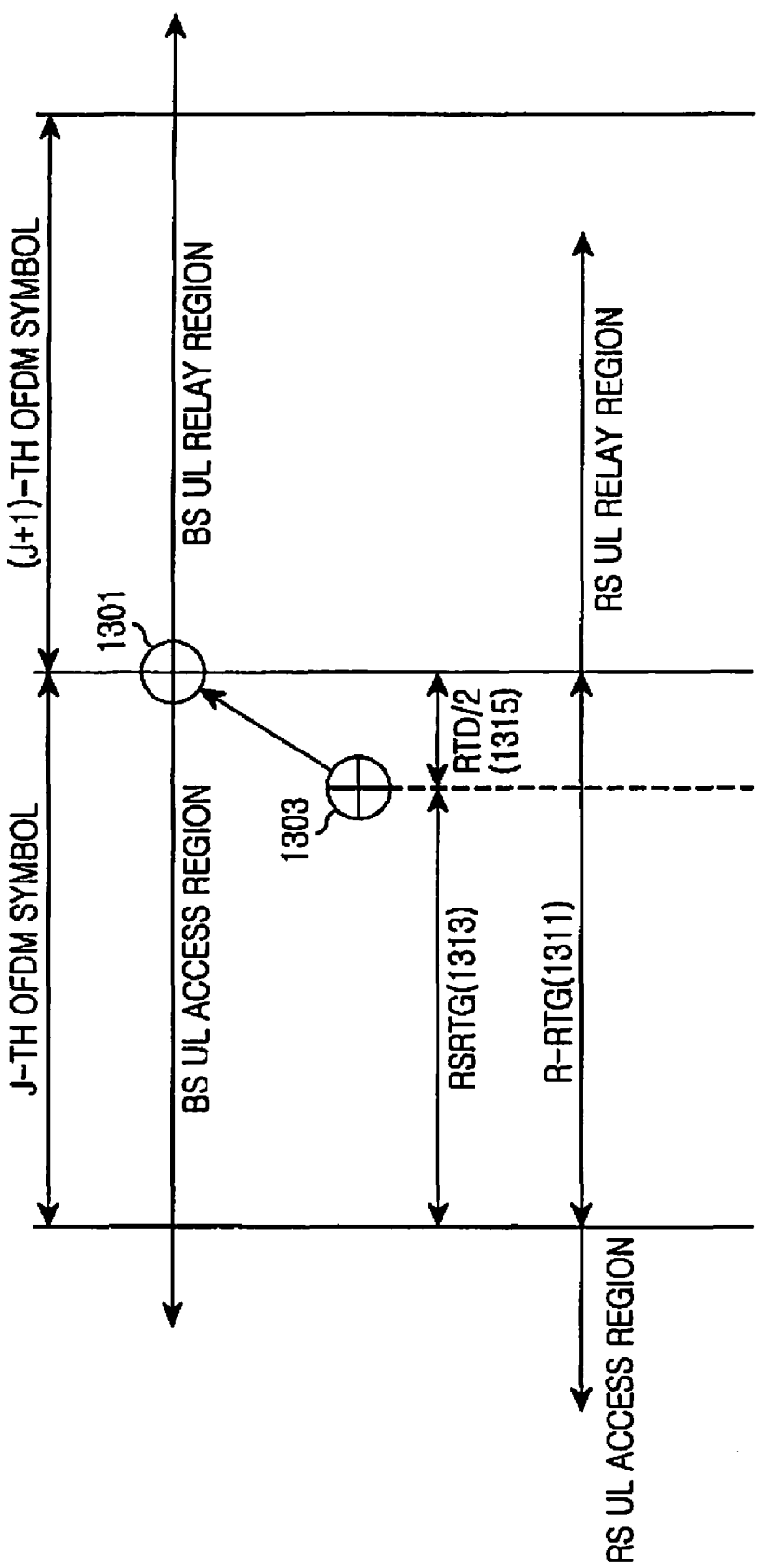
FIG. 13 illustrates an RS operation switch region of the UL subframe in the multihop relay wireless communication system according to an embodiment of the present invention.

FIG. 13 illustrates the RS operation switch region of the UL subframe in the multihop relay wireless communication system according to an embodiment of the present invention. A j-th OFDM symbol indicates the last symbol of the first interval 321 and a (j+1)-th OFDM symbol indicates the first symbol of the second interval 323.

As shown in FIG. 13, an Relay Station Receive/Transmit Transition Gap (RSRTG) 1313 for the RS operation switch region lies between the first interval 321 and the second interval 323 of the UL subframe 320. Hence, the RS changes from the Rx mode to the Tx mode in the RSRTG 1313.

The RS sends a UL signal at a time point 1303 by taking into account a UL Round Trip Delay (RTD)/2 1315 so that the BS can receive the UL signal at the time point 1301. For doing so, the RS needs to enter the Tx mode prior to the time point 1303.

The RS changes its operation during the RSRTG 1313. As a result, the RS cannot receive a UL signal from the second MS during the time period RSRTG+(RTD/2) 1311 at the end of the first interval 321 of the UL subframe 320. This region (e.g., RSRTG+(RTD/2) time period) for not receiving the signal in the first interval 321 is referred to as a UL overhead R-RTG 1311.

If the RS cannot send a signal using only a certain region by splitting one OFDM symbol, the RS sets the R-RTG 1311 as the smallest OFDM symbol including the region not receiving the signal. For example, when the RS switches its operation within the j-th OFDM symbol, the RS sets the j-th OFDM symbol to the R-RTG 1311. The R-RTG 1311 can be calculated based on Equation (2). The R-RTG 1311 has the OFDM symbol unit value.

$$R\text{-RTG}=[\text{OFDMsymbolunit}(\text{RSRTG}+\text{RTD}/2)] \quad (2)$$

In Equation (2), RSRTG denotes the RS operation switch region and RTD/2 denotes the UL Delay (ULD). OFDMsymbolunit(x) denotes a function that divides x by one OFDM symbol length. The value x and the OFDM symbol length are set by the time unit. ⌈ ⌉ denotes the ceiling function. When a value in the brackets is the fraction, the ceiling function outputs an integer greater than the fraction.

As expressed in Equation (2), the UL subframe overhead is the minimum symbol including the RS operation switch region.

As indicated above, the RS receives a signal from the second MS during the first interval 321, excluding an R-RTG 345, of the UL subframe 320. Thus, the second MS sends the signal to the RS during the first interval 321 excluding the R-RTG 345 under the control of the RS.

Referring back to FIG. 3, the RS sends a UL signal to the BS during the second interval 323 of the UL subframe 320 in the i-th frame 300. Next, the RS sends a DL signal to the second MS during the first interval of the DL subframe of the (i+1)-th frame 370. Accordingly, the RS does not need the time period for the operation switch between the second interval 323 of the UL subframe 320 and the first interval of the DL subframe. Yet, the RS frame 360 includes a Relay Frame Time Gap (RFTG) 341 between the second interval 323 and the first interval of the (i+1)-th frame 370 to hold the synchronization with the BS Frame 350. The RFTG 341 has the same value as the sum of the RTG 333 and the ULD.

Now, it is assumed that the wireless communication system constitutes each interval of the RS frame like the frame of the IEEE 802.16 system.

Figure 4:
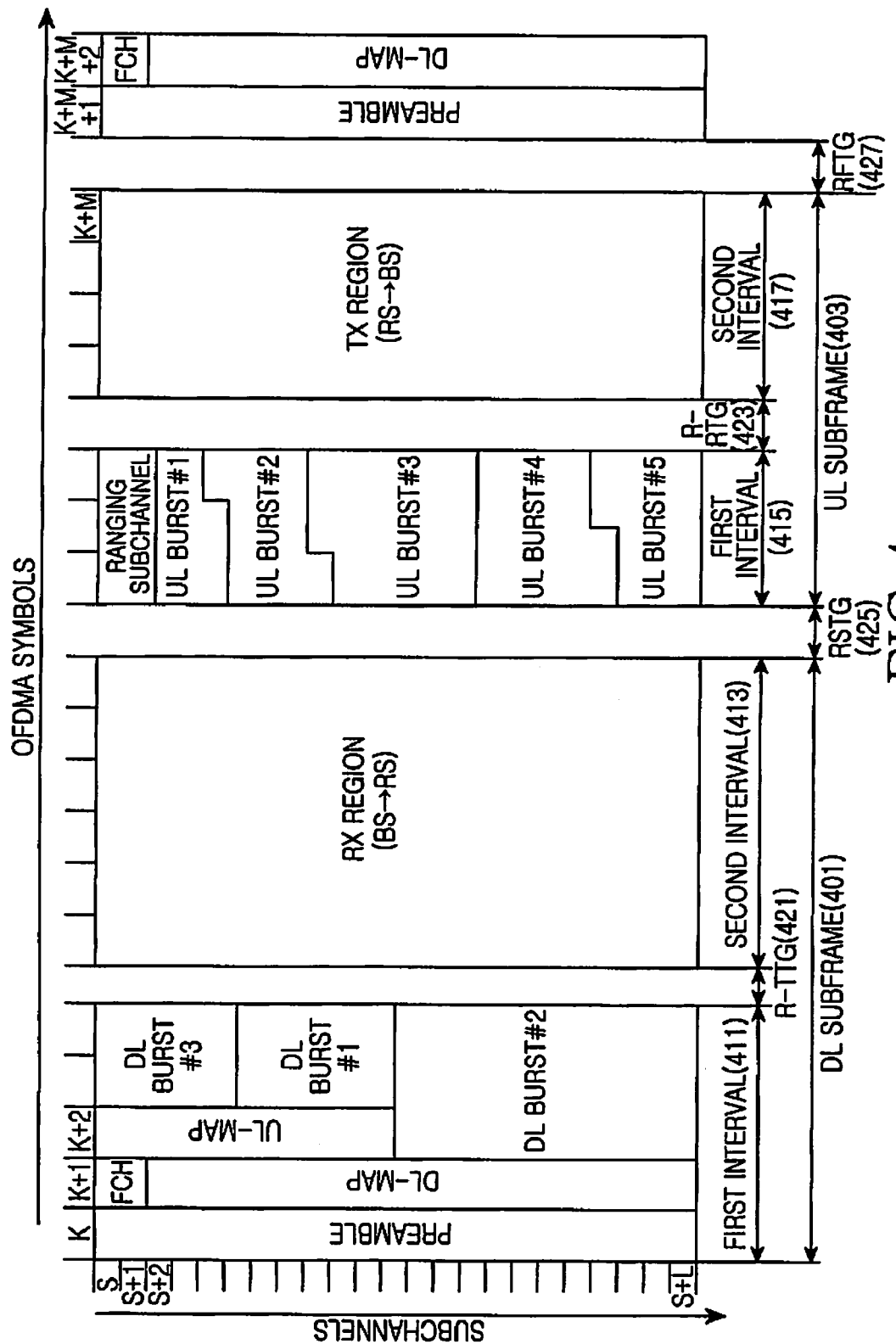
FIG. 4 illustrates a frame structure of a Relay Station (RS) in the multihop relay wireless communication system according to an embodiment of the present invention.

FIG. 4 illustrates a frame structure of the RS in the multihop relay wireless communication system according to an embodiment of the present invention.

The RS frame of FIG. 4 includes a DL subframe 401 and a UL subframe 403 split by the time resource. The DL subframe 401 and the UL subframe 403 are divided to first intervals 411 and 415 and second intervals 413 and 417, respectively, using the time resources. A time guard region RSTG 425 lies between the DL subframe 401 and the UL subframe 403, and a RFTG 427 lies between the UL subframe 403 and a DL subframe of a next frame.

The DL subframe 401 includes the first interval 411 for sending a DL signal from the RS to the MS traveling in the service coverage, and the second interval 413 for receiving a signal from the BS. A time guard region R-TTG 421 is inserted between the first interval 411 and the second interval 413.

The UL subframe 403 includes the first interval 415 for receiving a UL signal from the MS and the second interval 417 for sending a UL signal to the BS. A time guard region R-RTG 423 is inserted between the first interval 415 and the second interval 417.

If the wireless communication system is configured using the multiple hops, the RS needs to relay the signals between a first RS and a second RS as well as the signals between the BS and the MS. In this case, the RS supports a relay service by constituting the i-th frame and the (i+1)-th frame as a single super frame.

Figure 5:
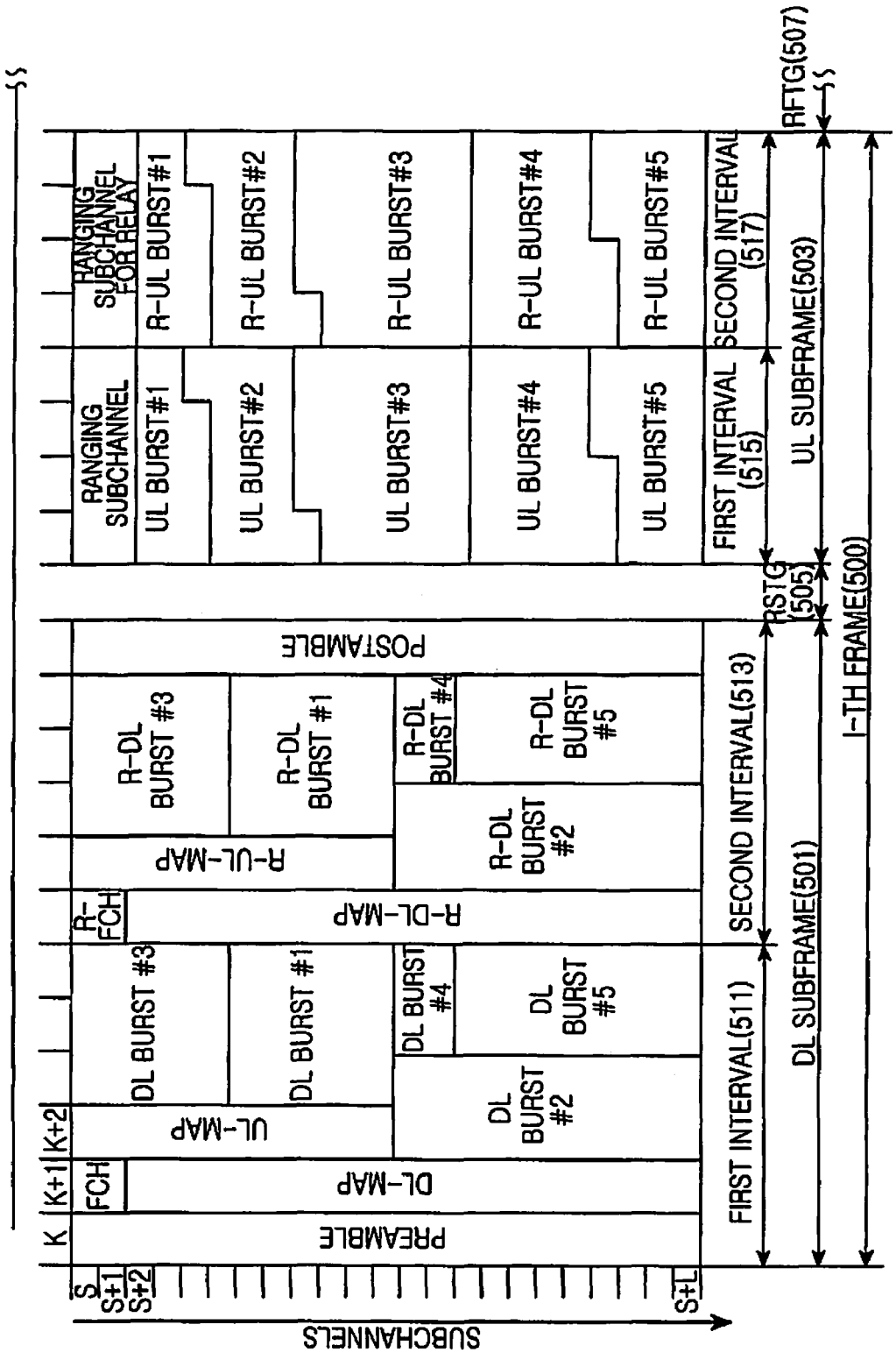
FIG. 5 illustrates a i-th frame of an even-hop RS in the multihop relay wireless communication system according to an embodiment of the present invention.
Figure 6:
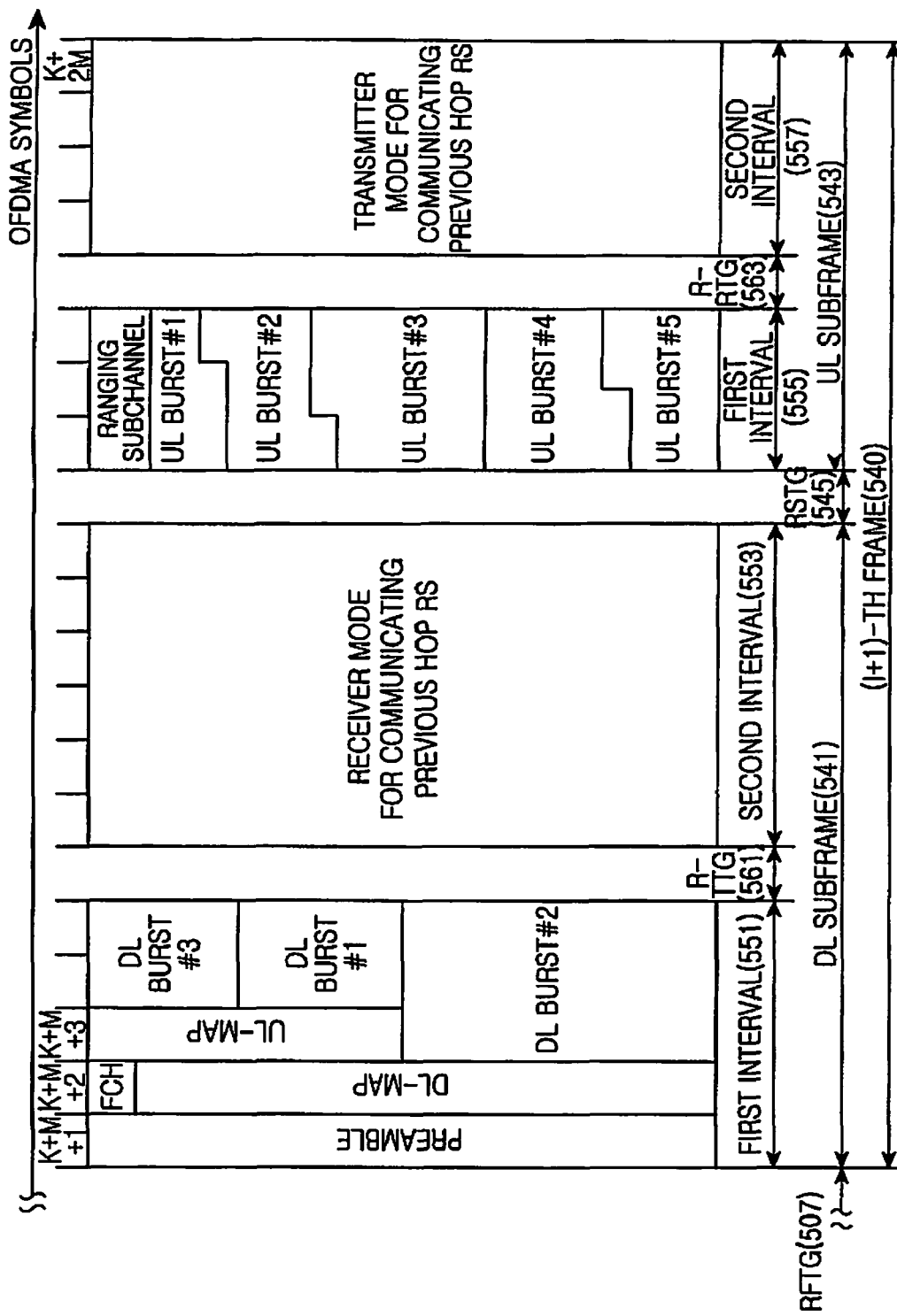
FIG. 6 illustrates a (i+1)-th frame of the even-hop RS in the multihop relay wireless communication system according to an embodiment of the present invention.

The frame of an even-hop RS is described in further detail in FIGS. 5 and 6.

FIG. 5 illustrates the i-th frame of the even-hop RS in the multihop relay wireless communication system according to an embodiment of present invention.

The i-th frame 500 of FIG. 5 includes a DL subframe 501 and a UL subframe 503 split by the time resource. The DL subframe 501 and the UL subframe 503 are divided into a first interval and a second interval using the time resource. A time guard region RSTG 505 lies between the DL subframe 501 and the UL subframe 503. A time guard region RFTG 507 lies between the i-th frame 500 and a (i+1)-th frame 540.

The DL subframe 501 includes the first interval 511 for sending a DL signal from the RS to the MS in the service coverage, and the second interval 513 for sending a DL signal to a next odd-hop RS.

The UL subframe 503 includes the first interval 515 for receiving a UL signal from the MS, and the second interval 517 for receiving a UL signal from the next odd-hop RS.

FIG. 6 illustrates a (i+1)-th frame of the even-hop RS in the multihop relay wireless communication system according to an embodiment of the present invention.

The (i+1)-th frame 540 of FIG. 6 is divided into a DL subframe 541 and a UL subframe 543 by the time resource. The DL subframe 541 and the UL subframe 543 are divided into a first interval and a second interval using the time resource. A time guard region RSTG 545 lies between the DL subframe 541 and the UL subframe 543. A time guard region RFTG 507 lies between the i-th frame 500 and the (i+1)-th frame 540.

The DL subframe 541 includes the first interval 551 for sending a DL signal from the RS to the MS in the service coverage, and the second interval 553 for receiving a DL signal from a previous odd-hop RS. The RS sends the signal over the first interval 551 and receives the signal over the second interval 553. For doing so, a time guard region R-TTG 561 is inserted for the RS operation switch between the first interval 551 and the second interval 553 of the DL subframe 541.

The UL subframe 543 includes the first interval 555 for receiving a UL signal from the MS and the second interval 557 for sending a UL signal to the previous odd-hop RS. The RS receives the signal over the first interval 555 and sends the signal over the second interval 557. In order for the RS to do so, a time guard region R-RTG 563 is inserted for the RS operation switch between the first interval 555 and the second interval 557 of the UL subframe 543.

Figure 7:
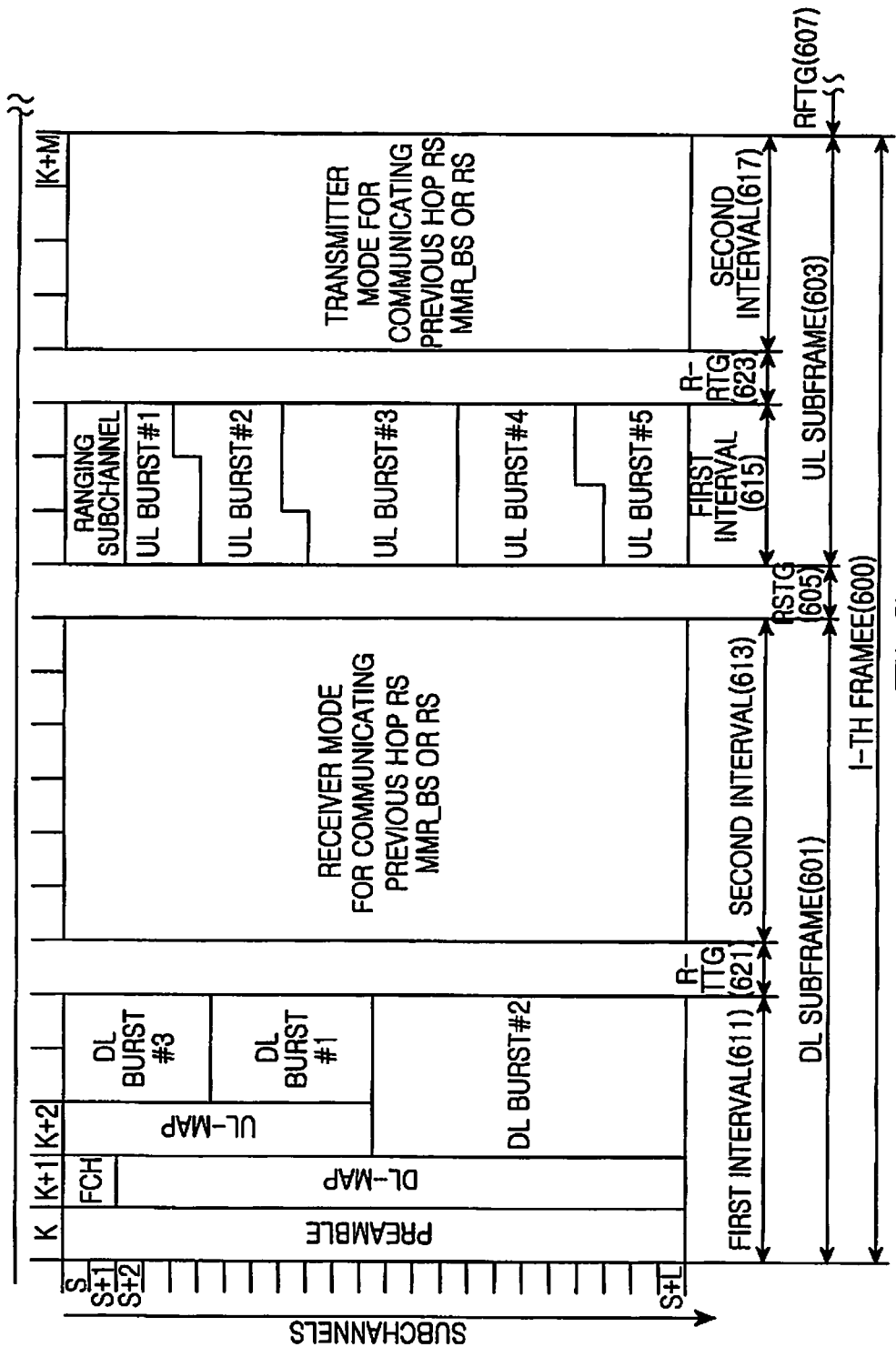
FIG. 7 illustrates a i-th frame of an odd-hop RS in the multihop relay wireless communication system according to an embodiment of the present invention.
Figure 8:
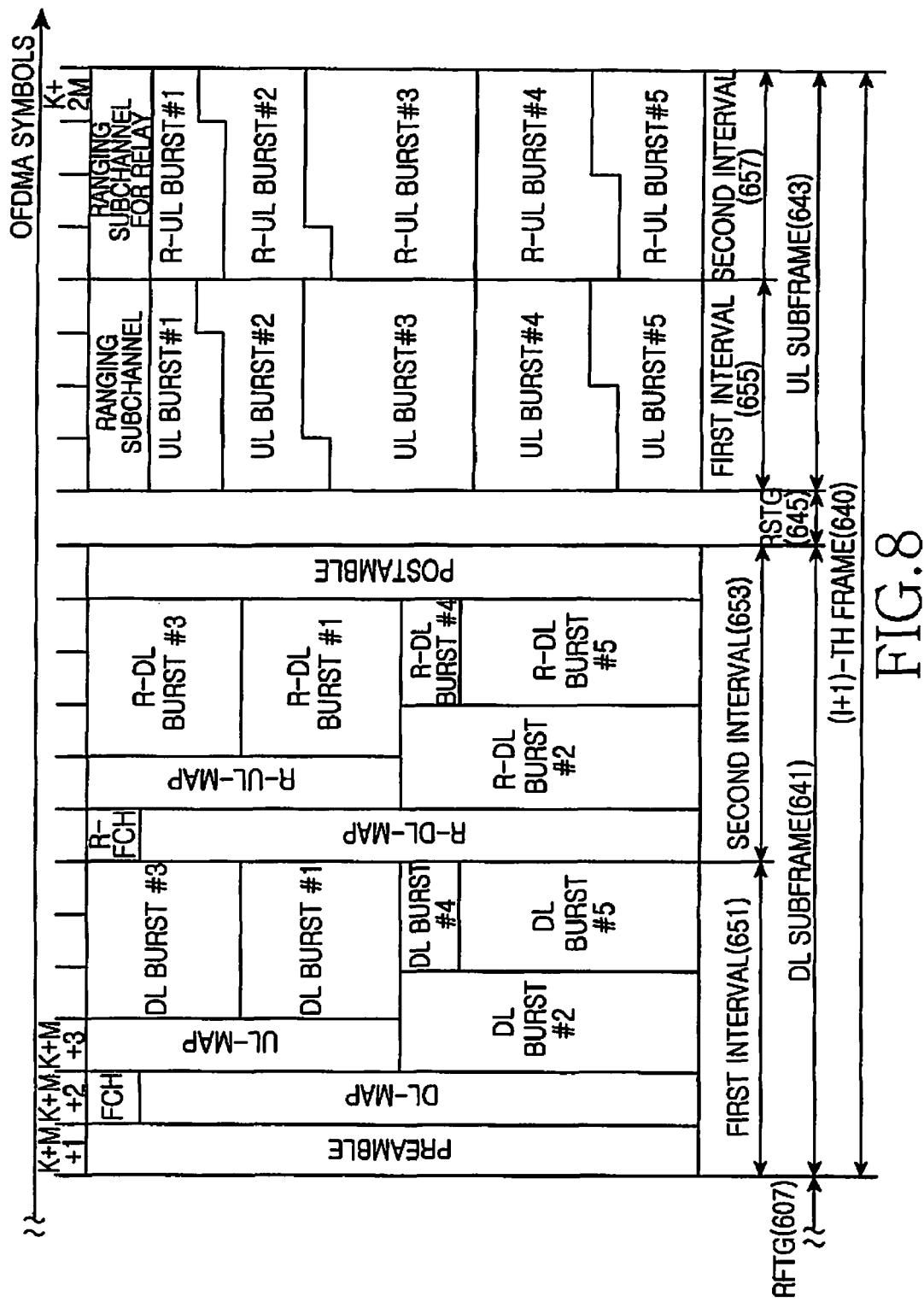
FIG. 8 illustrates a (i+1)-th frame of the odd-hop RS in the multihop relay wireless communication system according to an embodiment of the present invention.

The frame of the odd-hop RS is described in further detail in FIGS. 7 and 8.

FIG. 7 illustrates a i-th frame of the odd-hop RS in the multihop relay wireless communication system according to an embodiment of the present invention.

The i-th frame 600 of FIG. 7 is divided to a DL subframe 601 and a UL subframe 603 by the time resource. The DL subframe 601 and the UL subframe 603 are divided into a first interval and a second interval using the time resource. A time guard region RSTG 605 lies between the DL subframe 601 and the UL subframe 603. A time guard region RFTG 607 lies between the i-th frame 600 and a (i+1)-th frame 640.

The DL subframe 601 includes the first interval 611 for sending a DL signal from the RS to an MS in the service coverage, and the second interval 613 for receiving a DL signal from a previous even-hop RS. The RS sends the signal over the first interval 611 and receives the signal over the second interval 613. For doing so, a time guard region R-TTG 621 is inserted for the RS operation switch between the first interval 611 and the second interval 613 of the DL subframe 601.

The UL subframe 603 includes the first interval 615 for receiving a UL signal from the MS and the second interval 617 for sending a UL signal to the previous even-hop RS. The RS receives the signal over the first interval 615 and sends the signal over the second interval 617. For doing so, a time guard region R-RTG 623 is inserted for the RS operation switch between the first interval 615 and the second interval 617 of the UL subframe 603.

FIG. 8 illustrates a (i+1)-th frame of the odd-hop RS in the multihop relay wireless communication system according to an embodiment of the present invention.

The (i+1)-th frame of FIG. 8 is divided to a DL subframe 641 and a UL subframe 643 using the time resource. The DL subframe 641 and the UL subframe 643 are divided to a first interval and a second interval using the time resource. A time guard region Relay Subframe Time Gap (RSTG) 645 lies between the DL subframe 641 and the UL subframe 643. A time guard region Relay Frame Time Gap (RFTG) 607_lies between the i-th frame 600 and the (i+1)-th frame 640.

The DL subframe 641 includes the first interval 651 for sending a DL signal from the RS to an MS in the service coverage, and the second interval 653 for sending a DL signal to a next even-hop RS.

The UL subframe 643 includes the first interval 655 for receiving a UL signal from the MS and the second interval 657 for receiving a UL signal from the next even-hop RS.

A detailed description is provided below for a BS operation method for sending region information relating to the Tx/Rx operation switch of the RS in the wireless communication system.

Figure 9:
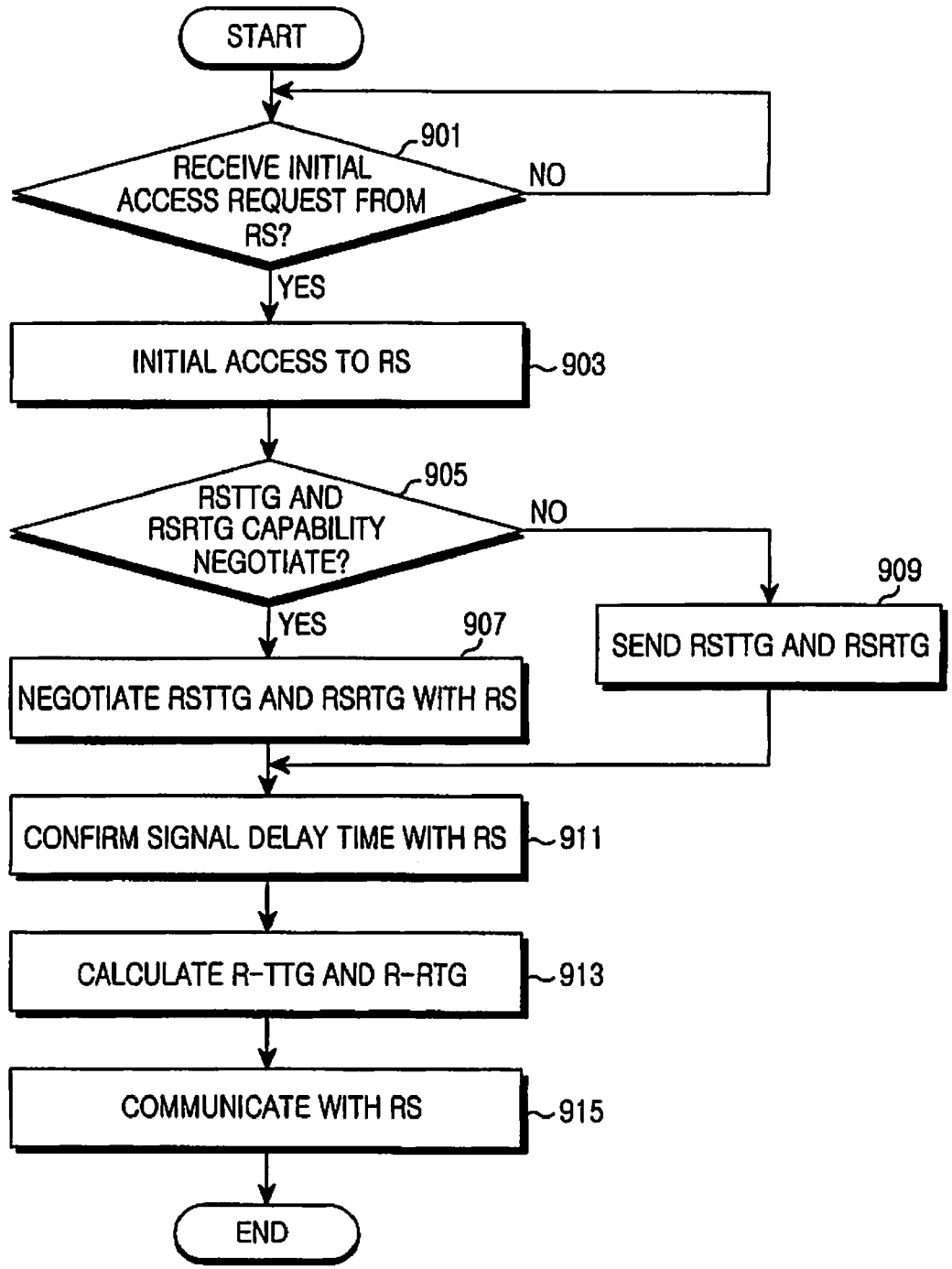
FIG. 9 illustrates operations of a Base Station (BS) in the multihop relay wireless communication system according to an embodiment of the present invention.

FIG. 9 illustrates operations of the BS in the multihop relay wireless communication system according to an embodiment of the present invention.

In FIG. 9, the BS examines whether an initial access request message is received from the RS in step 901.

When receiving the initial access request message, the BS performs the initial access to the RS in step 903.

In step 905, the BS determines whether to negotiate the RSTTG and the RSRTG with the RS. That is, the BS performs the capability negotiation with the RS during or after the initial access to the RS. In doing so, the BS determines whether to negotiate the RSTTG and the RSRTG with the RS.

When negotiating the RSTTG and the RSRTG with the RS, the BS negotiates the RSTTG and the RSRTG with the RS in step 907. In doing so, the BS can set different RSTTG and RSRTG for each RS. For example, to negotiate the RSTTG and the RSRTG, the BS and the RS should know maximum values of the RSTTG and the RSRTG The maximum values of the RSTTG and the RSRTG can be known to the BS and the RS in advance by setting them as system information, or they can be determined by the BS and then informed to the RS using broadcast information as shown in Table 1. For example, the BS can utilize a Downlink Channel Descriptor (DCD) message as the broadcast information.

TABLE 1

| Name | Type | Length | Value (variable length) |
| --- | --- | --- | --- |
| RSTTG | TBD | 1 | ≧xxx |
| RSRTG | TBD | 1 | ≧yyy |

In Table 1, xxx and yyy have the time value. The RSTTG information and the RSRTG information denote the times for the operation switch of the RS.

As mentioned above, after confirming the maximum values of the RSTTG and the RSRTG, the BS checks RSTTG and RSRTG received from the RS. That is, the BS checks the RS's desired RSTTG and RSRTG. Next, the BS determines the RSTTG and the RSRTG of the RS by considering the RS's desired RSTTG and the RSRTG and transmits response massage which may includes RSTTG and RSRTG determined by BS or Acknowledge message to the RS. The BS sets the RSTTG and the RSRTG to be less than or equal to the maximum values of the RSTTG and the RSRTG.

Alternatively, the BS may negotiate the RSTTG and the RSRTG by sending a response signal for the RS's desired RSTTG and RSRTG.

After negotiating the RSTTG and the RSRTG with the RS, the BS checks the signal delay time of the RS in step 911. In detail, the BS checks the signal delay time acquired in the process of the initial access or the random access the RS.

By contrast, when it is determined not to negotiate the RSTTG and the RSRTG with the RS in step 905, the BS determines the RSTTG and the RSRTG and transmits them to the RS during or after the initial access in step 909. The BS can transmit the RSTTG and the RSRTG to the RS using the broadcast information constituted as shown in Table 1. Alternatively, the BS may transmit the RSTTG and the RSRTG to the RS using the broadcast information prior to the initial access.

After sending the RSTTG and the RSRTG to the RS, the BS checks the signal delay times of the RS in step 911. In detail, the BS confirms the signal delay times acquired in the process of the initial access or the random access to the RS.

After confirming the signal delay time of the RS, the BS calculates the DL overhead R-TTG and the UL overhead R-RTG of the RS using the RSTTG and RSRTG information and the signal delay times of the RS in step 913. Namely, the BS calculates the DL overhead and the UL overhead of the RS to synchronize with the RS. The BS can calculate the R-TTG and the R-RTG based on Equation (1) and Equation (2).

After calculating the DL overhead and the UL overhead of the RS, the BS communicates with the RS by taking into account the DL overhead and the UL overhead of the RS in step 915, after which the methodology terminates.

According to the present invention, the BS negotiates the Tx/Rx operation switch times RSTTG and RSRTG with the RS or transmits the RSTTG and the RSRTG to the RS. Alternatively, the BS may calculate and transmit the DL overhead and the UL overhead of the RS to the RS.

According to an embodiment of the present invention, the BS negotiates the RSTTG and the RSRTG information with the RS or sends the RSTTG and the RSRTG information to the RS at the initial access to the RS. The BS may negotiate the RSTTG and RSRTG information with the RS or send the RSTTG and RSRTG information to the RS not only at the initial access but also in the connection with the RS. When the signal delay times are changed by the radio channel while the RS connected to the BS provides the relay service, the BS may re-negotiate the RSTTG and RSRTG information with the RS or generate and send the RSTTG and the RSRTG to the RS.

RS operations for confirming the DL overhead and the UL overhead using the RSTTG and the RSRTG received from the BS are illustrated in greater detail below.

Figure 10:
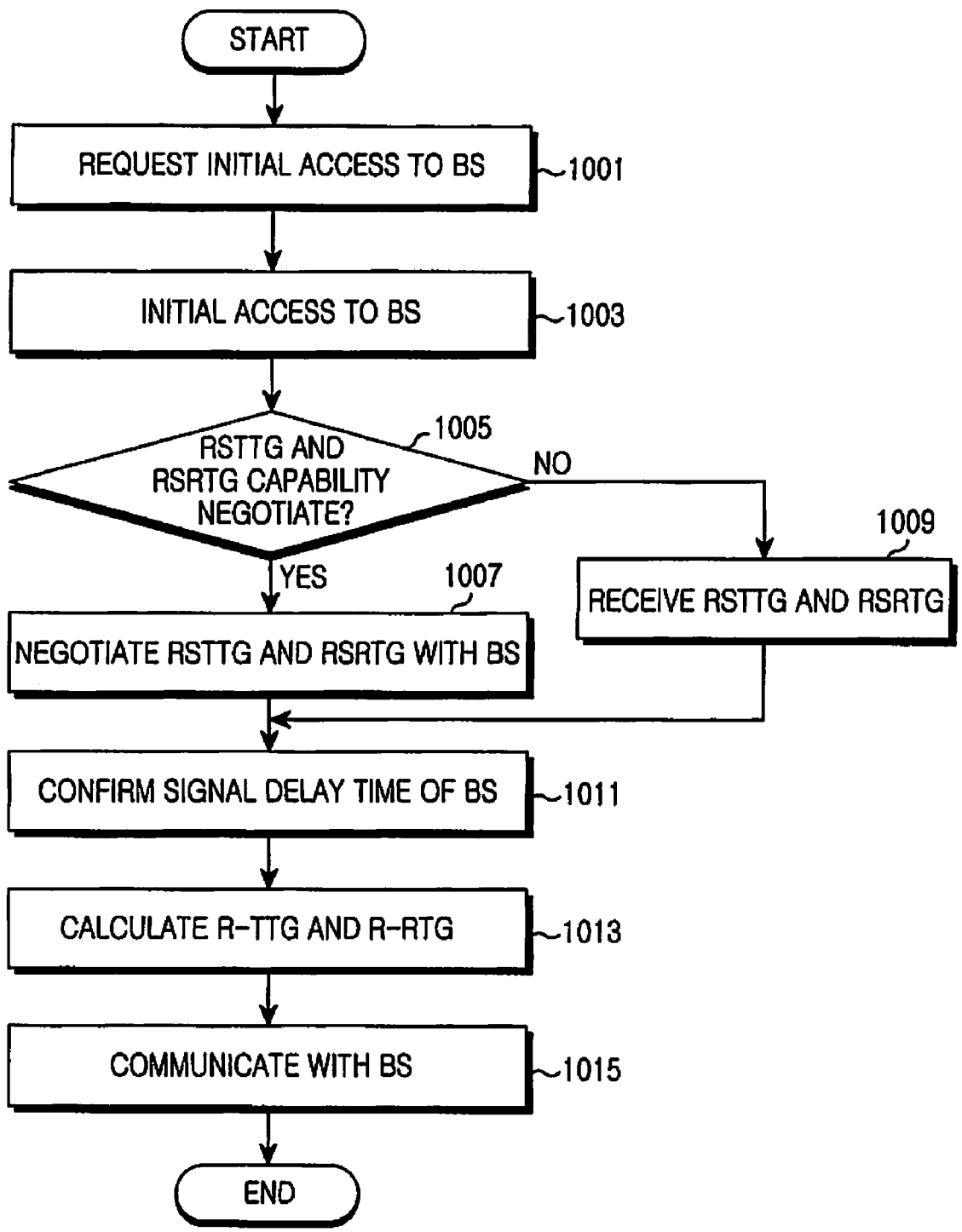
FIG. 10 illustrates operations of the RS in the multihop relay wireless communication system according to an embodiment of the present invention.

FIG. 10 illustrates the operations of the RS in the multihop relay wireless communication system according to an embodiment of the present invention.

In FIG. 10, the RS requests the initial access to the BS in step 1001.

After requesting the initial access to the BS, the RS performs the initial access to the BS in step 1003.

In step 1005, the RS determines whether to negotiate the RSTTG and the RSRTG with the BS. Specifically, the RS performs the capability negotiation with the BS during or after the initial access to the BS. In doing so, the RS determines whether to negotiate the RSTTG and the RSRTG with the BS.

If it is determined to negotiate the RSTTG and the RSRTG with the BS, the RS negotiates the RSTTG and the RSRTG with the BS in step 1007. For example, the RS determines and sends its desired RSTTG and RSRTG to the BS to negotiate the RSTTG and the RSRTG. Next, the RS receives response massage which may includes RSTTG and RSRTG determined by BS or Acknowledge message from the BS by taking into account the desired RSTTG and RSRTG. The RS determines its desired RSTTG and RSRTG by considering the maximum values of the RSTTG and the RSRTG. The maximum values of the RSTTG and the RSRTG can be set as the system information or provided from the BS using the broadcast information of Table 1.

After negotiating the RSTTG and the RSRTG with the BS, the RS checks the signal delay times of the BS in step 1011. In other words, the RS confirms the signal delay times acquired in the process of the initial access or the random access to the BS.

By contrast, when it is determined not to negotiate the RSTTG and the RSRTG with the BS, the RS receives the RSTTG and RSRTG information broadcast by the BS during or after the initial access in step 1009. Alternatively, the RS may receive the RSTTG and the RSRTG from the BS through the broadcast information prior to the initial access.

Upon receiving response message from the BS, the RS checks the signal delay times of the BS in step 1011. The RS checks the signal delay times acquired during the initial access or the random access to the BS.

Next, the RS calculates the DL overhead R-TTG and the UL overhead R-RTG using the RSTTG and the RSRTG information and the signal delay times of the BS in step 1013. The RS calculates the R-TTG and the R-RTG based on Equation (1) and Equation (2).

In step 1015, the RS communicates with the BS by taking into account the DL overhead and the UL overhead, after which the methodology terminates.

According to the present invention, the RS negotiates or calculates the R-TTG and R-RTG information using the RSTTG and RSRTG information received from the BS. Alternatively, the RS may confirm the R-TTG and the R-RTG calculated for the RS and received from the BS.

Figure 11:
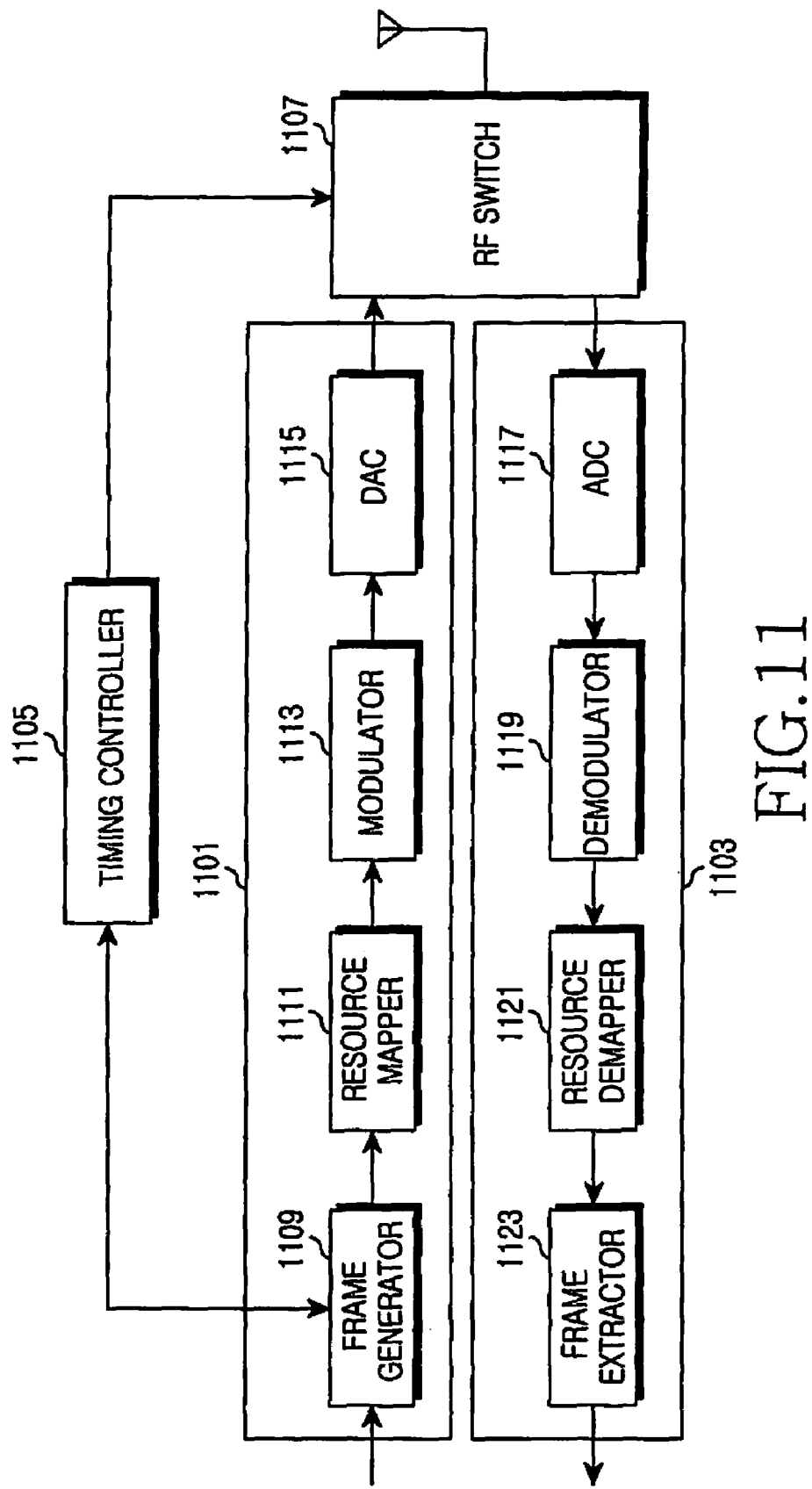
FIG. 11 illustrates the RS in the multihop relay wireless communication system according to an embodiment of the present invention.

In the following, a detailed description of the structure of the RS which supports the relay service using the RSTTG and RSRTG information received from the BS in the wireless communication system is provided. The RS is constituted as shown in FIG. 11. Since the BS, the even-hop RS, and the odd-hop RS are constituted substantially the same, only the RS structure is described.

FIG. 11 illustrates the RS in the multihop relay wireless communication system according to an embodiment of the present invention.

The RS of FIG. 11 includes a transmitter 1101, a receiver 1103, a timing controller 1105, and a Radio Frequency (RF) switch 1107.

The transmitter 1101 includes a frame generator 1109, a resource mapper 1111, a modulator 1113, and a Digital to Analog Converter (DAC) 1115.

The frame generator 1109 generates the frame as shown in FIG. 3 according to a control signal fed from the timing controller 1105. For example, the RS generates the subframe for the RS-MS link over the first interval of the frame and generates the subframe for the RS-BS link over the second interval.

The resource mapper 1111 maps the subframes provided from the frame generator 1109 to bursts of the corresponding link.

The modulator 1113 modulates the subframes mapped to the bursts of the link, which are fed from the resource mapper 1111, according to a corresponding Modulation and Coding Scheme (MCS) level.

The DAC 1115 converts the digital signal fed from the modulator 1113 to an analog signal and outputs the analog signal to the RF switch 1107.

The receiver 1103 includes an Analog to Digital Converter (ADC) 1117, a demodulator 1119, a resource demapper 1121, and a frame extractor 1123.

The ADC 1117 converts the analog signal received through the RF switch 1107 to a digital signal. The demodulator 1119 demodulates the digital signal fed from the ADC 1117 according to the corresponding modulation level (e.g., MCS level).

The resource demapper 1121 extracts the actual subframes mapped to the bursts of the link, which are fed from the demodulator 1119.

The frame extractor 1123 extracts a subframe corresponding to the RS from the subframes fed from the resource demapper 1121.

The RF switch 1107 forwards the signals transmitted and received to and from the BS, the MS, and other RS to the transmitter 1101 and the receiver 1103 under the control of the timing controller 1105.

The timing controller 1105 issues the control signal to generate the frame of FIG. 3 and to transmit and receive the signals according to the frame construction. At this time, the timing controller 110s issues a control signal that directs the transmitter 1101 and the receiver 1103 to change the mode using the RSTTG and RSTRG information received from the BS. The timing controller 1105 sets the R-TTG region between the first interval and the second interval of the DL subframe using the RSTTG information. The timing controller 1105 sets the R-RTG region between the first interval and the second interval of the UL subframe using the RSRTG information.

Figure 14:
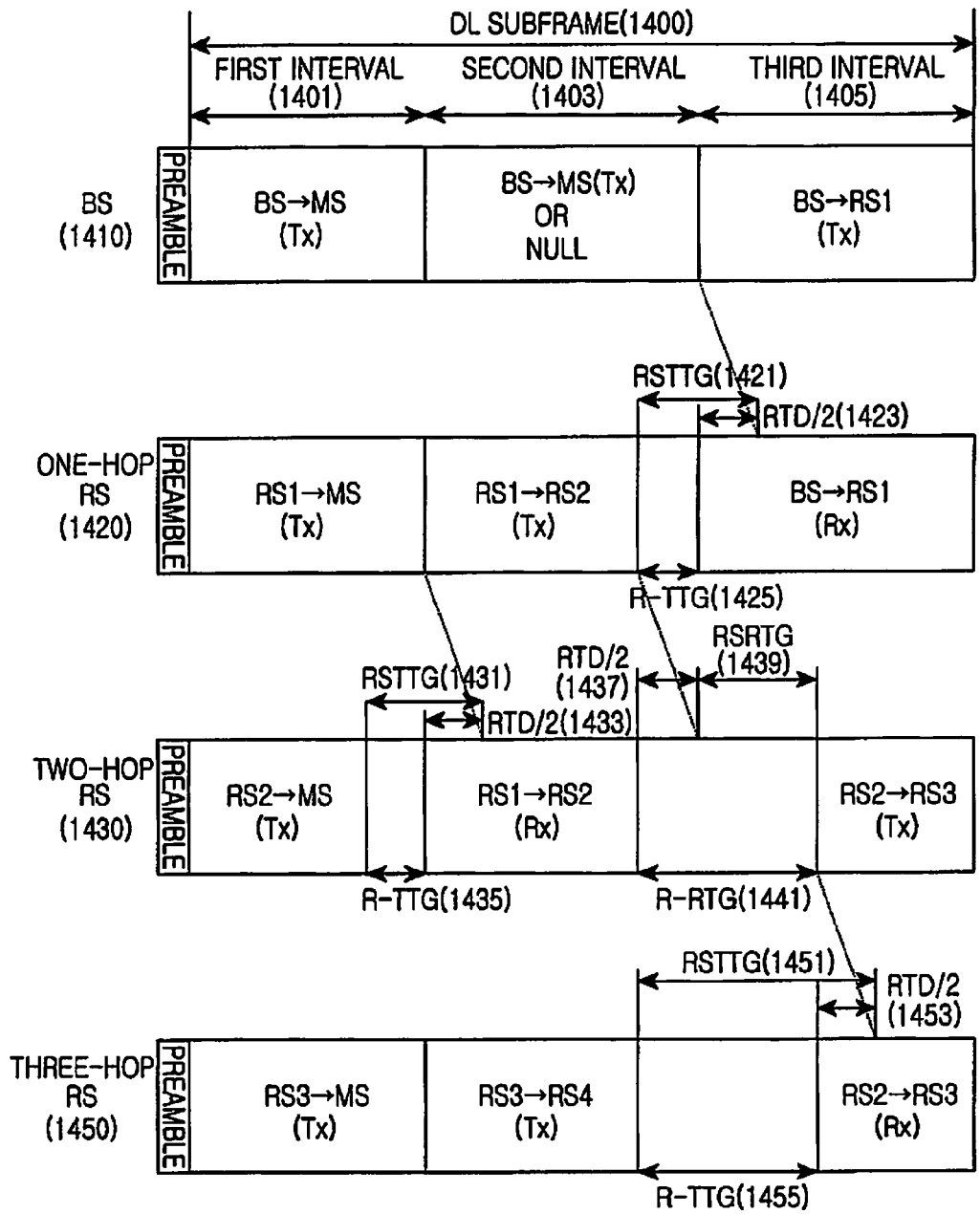
FIG. 14 illustrates another timing configuration of the multihop relay wireless communication system according to an embodiment of the present invention.

When the wireless communication system is constituted with the multiple hops, the BS and the RSs can communicate with each other using the frame structure of FIG. 14.

FIG. 14 illustrates another timing configuration of the multihop relay wireless communication system according to an embodiment of the present invention. Hereafter, the DL subframe is explained by way of an illustrative embodiment.

A DL subframe 1400 of FIG. 14 is divided into a first interval 1401, a second interval 1403, and a third interval 1405 using the time resources.

The DL subframe 1400 of a BS frame 1410 includes the first interval 1401 and the second interval 1403 for sending a signal from the BS to the first MS connected through the direct link, and the third interval 1405 for sending a signal from the BS to a one-hop RS. Herein, the second interval 1403 may be null.

The DL subframe 1400 of a one-hop RS frame 1420 includes the first interval 1401 for sending a signal to a second MS connected by the relay link, the second interval 1403 for sending a signal to a two-hop RS, and the third interval 1405 for receiving a signal from the BS. The DL overhead R-TTG 1425 is inserted between the second interval 1403 and the third interval 1405. The size of the R-TTG 1425 can be calculated by applying the RSTTG 1421 received from the BS and the signal delay times of the BS, RTD/2 1423, to Equation (1).

The DL subframe 1400 of a two-hop RS frame 1430 includes the first interval 1401 for sending a signal to a third MS connected through the relay link, the second interval 1403 for receiving a signal from the one-hop RS, and the third interval 1405 for sending a signal to a three-hop RS. The DL overhead R-TTG 1435 is inserted between the first interval 1401 and the second interval 1403. The DL overhead R-RTG 1441 is inserted between the second interval 1403 and the third interval 1405. The size of the R-TTG 1435 can be calculated by applying the RSTTG 1431 received from the one-hop RS and the signal delay times of the one-hop RS, RTD/2 1433, to Equation (1). The size of the R-RTG 1441 can be calculated by applying the RSRTG 1439 received from the one-hop RS and the signal delay times of the one-hop RS, RTD/2 1437, to Equation (2).

The DL subframe 1400 of a three-hop RS frame 1450 includes the first interval 1401 for sending a signal to a fourth MS connected through the relay link, the second interval 1403 for sending a signal to the four-hop RS, and the third interval 1405 for receiving a signal from the two-hop RS. The DL overhead R-TTG 1455 is inserted between the second interval 1403 and the third interval 1405. The size of the R-TTG 1455 can be calculated by applying the RSTTG 1451 received from the two-hop RS and the signal delay times of the two-hop RS, RTD/2 1453, to Equation (1).

As indicated above, when the wireless communication system is constituted with the multiple hops, the overhead of the DL subframe can include not only the R-TTG but also both of the R-TTG and the R-RTG In other words, the overhead of the DL subframe can vary according to the frame construction in the wireless communication system.

Similar to the overhead of the DL subframe, the overhead of the UL subframe can also vary according to the frame construction.

As set forth above, as the multihop relay wireless communication system provides the time guard region information from the BS to the RS, the RS is able to communicate with the accurate synchronization with the BS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An upper node operation method in a wireless communication system using a relay service, the method comprising the steps of:
   receiving a desired Relay Station Transmit/receive Transition Gap (RSTTG) and a desired Relay Station Receive/transmit Transition Gap (RSRTG) from a lower Relay Station (RS) during capability negotiation between the lower RS and the upper node for the relay service;
   determining, by the upper node, an RSTTG and an RSRTG using the desired RSTTG and the desired RSRTG during capability negotiation between the lower RS and the upper node for the relay service; and
   sending a control message having the RSTTG and the RSRTG to the lower RS, after determining the RSTTG and the RSRTG during the capability negotiation between the lower RS and the upper node for the relay service;
   wherein the RSTTG denotes a Transmit (Tx) mode to Receive (Rx) mode turnaround gap for the lower RS, and the RSRTG denotes an Rx mode to Tx mode turnaround gap for the lower RS.

2. The upper node operation method of claim 1, wherein the upper node is a Base Station (BS) or an upper RS.

3. The upper node operation method of claim 1, wherein the control message comprises at least one of confirm information for the RSTTG and the RSRTG received by the lower RS, the RSTTG and the RSRTG, and overhead information according to the RSTTG and the RSRTG of the lower RS.

4. The upper node operation method of claim 3, wherein the confirm information for the RSTTG and RSRTG received by the lower RS comprises at least one of identical information of the RSTTG and the RSRTG received by the lower RS and an acknowledge message for the RSTTG and the RSRTG received by the lower RS.

5. The upper node operation method of claim 3, wherein an overhead for changing from the Tx mode to the Rx mode of the overhead information of the lower RS is calculated based on:

$$R-TTG = \begin{cases} \lceil OFDMsymbolunit(RSTTG - RTD/2) \rceil, & RSTTG > RTD/2 \\ 0, & RSTTG \le RTD/2 \end{cases}$$

where R-TTG denotes the overhead according to the operation switch of the RS in a subframe, RSTTG denotes a Tx/Rx operation switch region of the RS, RTD/2 denotes a DownLink Delay (DLD) time of a signal, and OFDMsymbolunit(x) denotes a function which divides the value x by one Orthogonal Frequency Division Multiple (OFDM) symbol length.

6. The upper node operation method of claim 3, wherein an overhead for changing from the Rx mode to the Tx mode of the overhead information of the lower RS is calculated based on:

$$R\text{-}RTG = \lceil OFDMsymbolunit(RSRTG + RTD/2) \rceil$$

where R-RTG denotes the overhead according to the operation switch of the RS in a subframe, RSRTG denotes a Tx/Rx operation switch region of the RS, RTD/2 denotes a UpLink Delay (ULD) time of a signal, and OFDMsymbolunit(x) denotes a function which divides the value x by one OFDM symbol length.

7. A Relay Station (RS) operation method in a wireless communication system using a relay service, the method comprising the steps of:
   confirming, at the RS, signal delay times with an upper node;
   transmitting a desired Relay Station Transmit/receive Transition Gap (RSTTG) and a desired Relay Station Receive/transmit Transition Gap (RSRTG) from the RS to the upper node during capability negotiation between the upper node and the RS for the relay service, wherein the desired RSTTG denotes a Transmit (Tx) mode to Receive (Rx) mode turnaround gap determined at the RS, and the desired RSRTG denotes an Rx mode to Tx mode turnaround gap determined at the RS;
   calculating, at the RS, overheads according to a Tx/Rx operation switch using an RSTTG and an RSRTG received at the RS from the upper node and the signal delay times during capability negotiation between the upper node and the RS for the relay service;
   switching from the Rx mode to the Tx mode in the RS using a first overhead of the overheads; and
   switching from the Tx mode to the Rx mode in the RS using a second overhead of the overheads.

8. The RS operation method of claim 7, wherein the signal delay times are acquired in the process of an initial access or a random access to the upper node.

9. The RS operation method of claim 7, wherein calculating overheads according to the Tx/Rx operation switch comprises:
   calculating overheads according to the Tx/Rx operation switch using the RSTTG, the RSRTG and the signal delay times, when an acknowledge message for the transmitted desired RSTTG and RSRTG is received from the upper node during the capability negotiation with the upper node.

10. The RS operation method of claim 7, wherein calculating overheads according to the Tx/Rx operation switch comprises:
    identifying the RSTTG and the RSRTG in a control message received from the upper node during the capability negotiation with the upper node when an acknowledge message for the transmitted desired RSTTG and RSRTG is received from the upper node during the capability negotiation with the upper node, wherein the RSTTG and the RSRTG is determined at the upper node; and
    calculating overheads according to the Tx/Rx operation switch using the RSTTG, the RSRTG and the signal delay times.

11. The RS operation method of claim 7, wherein the RSTTG and the RSRTG are smaller than or equal to maximum values of the RSTTG and RSRTG.

12. The RS operation method of claim 11, wherein the maximum values of the RSTTG and RSRTG are set by system common information or provided from the upper node.

13. The RS operation method of claim 7, wherein the first overhead is calculated based on:

$$R - TTG = \begin{cases} \lceil OFDMsymbolunit(RSTTG - RTD/2) \rceil, & RSTTG > RTD/2 \\ 0, & RSTTG \leq RTD/2 \end{cases}$$

where R-TTG denotes the overhead according to the operation switch of the RS in a subframe, RSTTG denotes a Tx/Rx operation switch region of the RS, RTD/2 denotes a DownLink Delay (DLD) time of a signal, and OFDMsymbolunit(x) denotes a function which divides the value x by one OFDM symbol length.

14. The RS operation method of claim 7, wherein the second overhead is calculated based on:

R-RTG=[OFDMsymbolunit(RSRTG+RTD/2)]

where R-RTG denotes the overhead according to the operation switch of the RS in a subframe, RSRTG denotes a Tx/Rx operation switch region of the RS, RTD/2 denotes a UpLink Delay (ULD) time of a signal, and OFDMsymbolunit(x) denotes a function which divides the value x by one OFDM symbol length.

15. The RS operation method of claim 7, wherein the upper node is a Base Station (BS) or an upper RS.

16. A Relay Station (RS) in a wireless communication system using a relay service, the RS comprising:
a timing controller for issuing a timing signal for a Transmit (Tx) and Receive (Rx) operation switch;
a transmitter for providing a frame according to a frame construction and sending the frame via an antenna when the RS enters a Tx mode according to the timing signal; and
a receiver for detecting and confirming a corresponding subframe from the frame received on the antenna when the RS enters a Rx mode according to the timing signal;
wherein the timing controller calculates overheads for a Relay Station Transmit/receive Transition Gap (RSTTG) and a Relay Station Receive/transmit Transition Gap (RSRTG) and provides a timing signal according to the overheads;
wherein the RSTTG denotes a Tx mode to Rx mode turnaround gap determined at the RS, and the RSRTG denotes an Rx mode to Tx mode turnaround gap determined at the RS; and
wherein the transmitter transmits the RSTTG and the RSRTG to an upper node during capability negotiation between the upper node and the RS for the relay service.

17. The RS of claim 16 wherein the timing controller calculates an overhead for changing from the Tx mode to the Rx mode of the overheads based on:

$$R - TTG = \begin{cases} \lceil OFDMsymbolunit(RSTTG - RTD/2) \rceil, & RSTTG > RTD/2 \\ 0, & RSTTG \leq RTD/2 \end{cases}$$

where R-TTG denotes the overhead according to the operation switch of the RS in the subframe, RSTTG denotes a Tx/Rx operation switch region of the RS, RTD/2 denotes a DownLink Delay (DLD) time of a signal, and OFDMsymbolunit(x) denotes a function which divides the value x by one OFDM symbol length.

18. The RS of claim 16, wherein the timing controller calculates an overhead for changing from the Rx mode to the Tx mode of the overheads based on:

R-RTG=[OFDMsymbolunit(RSRTG+RTD/2)]

where R-RTG denotes the overhead according to the operation switch of the RS in the subframe, RSRTG denotes a Tx/Rx operation switch region of the RS, RTD/2 denotes a UpLink Delay (ULD) time of a signal, and OFDMsymbolunit (x) denotes a function which divides the value x by one OFDM symbol length.

19. The RS of claim 16, wherein the upper node is a Base Station (BS) or an upper RS.

* * * * *